United States Patent Office 3,148,981
Patented Sept. 15, 1964

3,148,981
METAL-OXIDE GRADIENT CERAMIC BODIES
Eugene I. Ryshkewitch, Ridgewood, N.J., assignor to National Beryllia Corp., Haskell, N.J., a corporation of New Jersey
No Drawing. Filed Apr. 21, 1961, Ser. No. 104,507
5 Claims. (Cl. 75—206)

This invention relates to a ceramic body made up of two basic components one metallic and the other oxide in which there is a gradual change in proportion of the two components from one side or end to the other and to the process of making such bodies.

It will be understood that the term metal includes alloys and mixtures of metals as well as a single metal and that the term "oxides" includes the silicates as well as the simpler oxides.

Broadly, this invention relates to the class of materials called "cermets" which defines a class of materials useful at high temperatures which have certain of the desirable properties of ceramics, being refractory, for example, and certain of the desirable properties of metals including a certain amount of ductility, for example. The field of "cermets" or possible cermets has been studied intensively for several years. Invariably, it has been sought to make "cermet" bodies as uniform in composition throughout the body as technically possible because no method of obtaining sound, stable, crack-free combinations of varying composition within a body has been considered possible.

One exception to this practice has been found in the recent monograph, "Cermets," J. R. Tinkelpaugh and W. B. Grandall, Reinhold Pub. Corp., N.Y. (1960). This monograph pretty well sums up the state of the art at the present time and comprises contributions of twenty-two noted workers in the field and includes about 550 references. The exception noted is on page 80 of this publication where the term "graded cermet" is used to describe a body made by the infiltration process in which the non-metallic phase consisting of titanium carbide is infiltrated by molten metals which wet the titanium carbide. This technique cannot work with oxide or silicate materials because these materials are not wet by molten metals.

Among the objects of the present invention is to provide a "graded cermet" in which the ceramic component of the body consists primarily or essentially of oxide (including silicate) materials.

Among other objects of the invention is to provide a process for making such graded cermets of oxide type ceramic components.

The objects of the invention are attained by preparing an appropriate number of uniform metal-oxide batches, each containing a stepwise increasing concentration of the metallic component varying in steps from about 1% to 100% by volume of metal (the remainder consisting essentially of the oxide component); molding or casting bodies made up of stratified layers of the ordered batches so as to provide composite bodies which are graded stepwise and sintering the thus obtained bodies.

Since in general, the termal expansion coefficients of oxide (or silicate) components differ from those of the metallic components, the areas of mutual contact of both constituents must be as small as possible, in order to avoid stresses, particularly microstresses, arising from a differential volume change of single components upon cooling or heating. In other words, the particle size of both initial materials (metal on the one side, and oxide and/or silicate on the other) should be very small.

The greater the difference of their respective expansion coefficients, the smaller the particles are required to be. Experimentally, it was found that materials as W on the one side ($\alpha = 3 \times 10^{-6}$ ° C.), and BeO on the other side ($\alpha = 10 \times 10^{-6}$ ° C.) can be combined to a compound ceramic body, without any interfacial cracks, stemming from the mentioned possible stresses, when the maximum particle sizes are of the order of magnitude of $40\mu$ (—325 mesh screen).

The compositions to be combined together must be selected in a definite way, in order to produce a sound body, without excessive macro-stresses at the interface between different compositions—similar to micro-stresses between metallic and non-metallic particles in a compound body.

The reason for the macro-stresses is essentially the same as for the micro-stresses: each (metal-non-metal) composition will have its own overall expansion coefficient and its own overall mechanical strength or resistance to endure a specific stress. Therefore, only such compositions are to be in mutual contact within the gradient body, which would develop less macro-stresses than their corresponding strength.

However, it has been found that the sequent batches can differ by significant amounts, that is, the difference in composition can be more than infinitesimal. One feature of the invention is based on the discovery that the compositions of the sequent layers expressed as metal/oxide by volume should vary from the linear relationship directly as the strength of the separate compositions changes, that is, if the strength of the compositions increase rapidly as the metal content increases then the variation in metal/oxide by volume content can increase more rapidly on the high metal side of the product. Thus, where the high metal layers have greater strength, as frequently happens, the sequent layers should vary approximately *linearly* with respect to the weight distribution and not with respect to volume of the two constituents. The following table, which shows a very satisfactory series of batches for making a sound, gradient BeO-W compound ceramic body, illustrates this discovery:

TABLE I

| Batch No. | Wt. Percent BeO | Volume Percent | |
|---|---|---|---|
| | | BeO | W |
| 1 | 100 | 100 | 0 |
| 2 | 90 | 98 | 2 |
| 3 | 80 | 96 | 4 |
| 4 | 70 | 94 | 6 |
| 5 | 60 | 91 | 9 |
| 6 | 50 | 87 | 13 |
| 7 | 40 | 80 | 20 |
| 8 | 30 | 73 | 27 |
| 9 | 20 | 67 | 33 |
| 10 | 10 | 42 | 58 |
| 11 | 5 | 25 | 75 |
| 12 | 0 | 0 | 100 |

In other words, the volume decrease of beryllia at the BeO-side must be slow; at the 100% W-side, it can be rapid as indicated by the table. The explanation for these distribution characteristics is that tungsten-rich bodies have much higher strengths than beryllia-rich bodies. Accordingly, the stresses (and steps) at the tungsten side can be correspondingly higher. In practice, it has been found that not all the mentioned batches are really needed to produce a sound compound body of this kind: every second batch of the above table can be eliminated without a detrimental effect.

As a very minimum, a series of at least five compositions including the compositions at the ends whch may be pure metal or pure oxide, should be employed.

For similar combinations such as $Al_2O_3$-Cr and $$Al_2O_3\text{-Mo}$$

substantially the same variation in the sequent layers may be employed.

Distributions which vary from the linear volume-volume relationship in the opposite direction must be chosen for the combination beryllia-beryllium, because the specific gravity, the expansion coefficient and the strength characteristics of these constituents are in a certain sense just opposite to that of the BeO-W combination. Also, since the melting point of beryllium is far below the sintering temperature of the BeO-Be body, it is not practicable or even possible to exceed 50 volume percent of the metallic component in the composition body. The final step can be achieved by sintering pure metal powder to the 50/50 volume percent body, below the melting point of the metal.

The following examples further illustrate the process of the invention.

Example 1

A series of batches of BeO and W are made corresponding to those of Table I. Layers of said batches are introduced consecutively into a mold cavity in an amount sufficient to provide 1–2 mm. thickness per layer when compressed. After the introduction of each new batch the layer is at least leveled-off and may be preliminarily compressed. It will be realized that during compression a certain intermingling or diffusion of the layers takes place which decreases the differences between the layers. When the final layer has been added, a pressure of about 1000–10,000 p.s.i. is applied to provide the molded article. This article is then transferred to a kiln where the article is sintered at about 1850° C.

Example 2

The process is conducted as in Example 1 except that only batches 1, 3, 5, 7, 9, 11 and 12 are employed.

Example 3

Six batches similar to alternate batches of Table I are provided except that the $Al_2O_3$ is substituted for BeO and Cr is substituted for W. The composition comprises weight percentages of $Al_2O_3$ corresponding to 100, 85, 65, 35, 150 which are equivalent to the following volume percentages 100, 90, 75, 50, 25, 0, respectively. The product is molded as in Example 1 and sintered at about 1850°.

Example 4

The process is carried out as in Example 3 with $Al_2O_3$ and Mo, the batches having the following composition:

| Batch No. | 1 | 2 | 3 | 4 | 6 | 6 |
|---|---|---|---|---|---|---|
| Percent Vol. $Al_2O_3$ | 100 | 90 | 80 | 60 | 40 | 0 |
| Percent Wt. $Al_2O_3$ | 100 | 80 | 60 | 40 | 20 | 0 |

The features and principles underlying the invention described above in connection with specific examplifications will suggest to those skilled in the art many other modifications thereof. It is accordingly desired that the appended claims shall not be limited to any specific feature or details thereof.

I claim:

1. Process for the manufacture of graded cermets of metal and oxide components changing from a high proportion of metal by volume at one region to a high proportion of oxide by volume at an opposite region, comprising
    providing a series of at least 5 up to about 11 powder batches of very finely divided and intimately mixed metal and metallic oxide components of gradually increasing oxide content from the first batch up to the last batch, the last batch consisting substantially entirely of the metallic oxide,
    the metal/metal oxide ratios in said series of batches varying approximately directly (as a straight line) by weight rather than by volume,
    combining substantially equal layers of said series of ordered batches in sufficient amount to provide layers of at least about 1 mm. per batch in thickness when compressed,
    compressing said layers to form an article and sintering the resultant article.

2. The process as claimed in claim 1 in which the metal is tungsten and the oxide is beryllia and in which the maximum size of said tungsten and beryllia powders is 40 microns.

3. The process as claimed in claim 1 in which the metal is chromium and the oxide is alumina.

4. The process as claimed in claim 1 in which the metal is molybdenum and the oxide is alumina.

5. The process as claimed in claim 1 in which the metal is beryllium and the oxide is beryllia, the maximum Be/BeO proportion by volume being 50/50.

References Cited in the file of this patent

UNITED STATES PATENTS

| | | |
|---|---|---|
| 2,431,660 | Gaudenzi | Nov. 25, 1947 |
| 2,462,906 | Sauenborn | Mar. 1, 1949 |
| 2,657,961 | Lassberg | Nov. 3, 1953 |
| 2,696,652 | Cronin | Dec. 14, 1954 |
| 2,843,646 | Conant | July 15, 1958 |